United States Patent [19]

Ackland et al.

[11] Patent Number: 4,509,187

[45] Date of Patent: Apr. 2, 1985

[54] TIME WARP SIGNAL RECOGNITION PROCESSOR USING RECIRCULATING AND/OR REDUCED ARRAY OF PROCESSOR CELLS

[75] Inventors: Bryan D. Ackland, East Windsor; David J. Burr, Tinton Falls, both of N.J.; Neil H. E. Weste, Durham, N.C.

[73] Assignee: AT&T Bell Laboratories, Murray Hill, N.J.

[21] Appl. No.: 388,033

[22] Filed: Jun. 14, 1982

[51] Int. Cl.³ ............................ G06K 9/64; G10L 1/00
[52] U.S. Cl. ...................................... 381/43; 364/200; 364/513.5
[58] Field of Search ............ 381/364 MS File, 34 HS, 381/35, 42, 43 HS, 48

[56] References Cited

U.S. PATENT DOCUMENTS 3,473,160 10/1969 Wahlstrom .......................... 364/900
4,174,514 11/1979 Sternberg ............................ 364/200
4,181,821 1/1980 Pirz et al. ............................. 381/43
4,384,273 5/1983 Ackland et al. ..................... 381/43

OTHER PUBLICATIONS

First International Joint Conference on Pattern Recognition, 10/30/73-11/1/83, Wash. D.C.

Proceedings of the Caltech Conference on VLSI, 1/22/79-1/24/79, Calif. Institute of Technology.

Primary Examiner—Gareth D. Shaw
Assistant Examiner—Paul M. Demetry
Attorney, Agent, or Firm—Richard J. Roddy

[57] ABSTRACT

In known speech recognition systems, processors and methods, utterances are analyzed to obtain a set of reference signals. An unknown signal may be compared with the reference signals. The unknown signal may be said to be the reference signal with which it most closely corresponds as defined by some correspondence measure. Known signal recognition arrangements using multiple processor cells tend to be expensive, in part because they tend to use many processor cells.

The disclosed system, processor and method contemplate an arrangement including an array of processor cells for time warping an unknown signal having m elements with respect to a reference signal having n elements or vice versa. The cells, responsive to control signals on a control diagonal, generate the correspondence measure. As the signals propagate through the array, the instant arrangement recirculates signals from cells near one (or first) periphery of the arrangement, e.g., from the right periphery, to cells near another (or second) periphery, e.g., to the left periphery. As a result, rather than using m×n processor cells, the instant arrangement may use substantially less than m×n cells.

10 Claims, 9 Drawing Figures

| | | | |
|---|---|---|---|
| | | | |
| | | | |
| | | | |
| $a_1c_1$ | | | |

2

| | | | |
|---|---|---|---|
| | | | |
| $a_2c_1$ | | | |
| $A_{11}$ | $a_1c_2$ | | |
| | | | |

3

| | | | |
|---|---|---|---|
| | | | |
| $a_3c_1$ | | | |
| $A_{21}$ | $a_2c_2$ | | |
| $b_1c_1$ | $A_{12}$ | $a_1c_3$ | |

4

| | | | |
|---|---|---|---|
| $a_4c_1$ | | | |
| $A_{31}$ | $a_3c_2$ | | |
| $b_2c_1$ | $A_{22}$ | $a_2c_3$ | |
| $B_{11}$ | $b_1c_2$ | $A_{13}$ | $a_1c_4$ |

5

| | | | |
|---|---|---|---|
| $A_{41}$ | $a_4c_2$ | | |
| $b_3c_1$ | $A_{32}$ | $a_3c_3$ | |
| $B_{21}$ | $b_2c_2$ | $A_{23}$ | $a_2c_4$ |
| | $B_{12}$ | $b_1c_3$ | $A_{14}$ |

6

| | | | |
|---|---|---|---|
| $b_4c_1$ | $A_{42}$ | $a_4c_3$ | |
| $B_{31}$ | $b_3c_2$ | $A_{33}$ | $a_3c_4$ |
| | $B_{22}$ | $b_2c_3$ | $A_{24}$ |
| | | $B_{13}$ | $b_1c_4$ |

7

| | | | |
|---|---|---|---|
| $B_{41}$ | $b_4c_2$ | $A_{43}$ | $a_4c_4$ |
| | $B_{32}$ | $b_3c_3$ | $A_{34}$ |
| | | $B_{23}$ | $b_2c_4$ |
| | | | $B_{14}$ |

8

| | | | |
|---|---|---|---|
| | $B_{42}$ | $b_4c_3$ | $A_{44}$ |
| | | $B_{33}$ | $b_3c_4$ |
| | | | $B_{24}$ |
| | | | |

9

| | | | |
|---|---|---|---|
| | | $B_{43}$ | $b_4c_4$ |
| | | | $B_{34}$ |
| | | | |
| | | | |

10

| | | | |
|---|---|---|---|
| | | | $B_{44}$ |
| | | | |
| | | | |
| | | | |

TIME WARP SIGNAL RECOGNITION PROCESSOR USING RECIRCULATING AND/OR REDUCED ARRAY OF PROCESSOR CELLS

TECHNICAL FIELD

This invention relates to signal processors and, more particularly, to a signal processor for dynamically time warping and for matching signal patterns.

BACKGROUND OF THE INVENTION

Signal processors for matching signal patterns such as speech signal patterns or visual signal patterns are known. For example, U.S. Pat. No. 4,181,821; issued Jan. 1, 1980 entitled "Multiple Template Speech Recognition System;" discloses a processor for matching, or recognizing, an unknown speech signal as one of a set of reference signals. In known speech recognition systems, an input speech signal representing an audible utterance is analyzed to provide a set of feature signals which characterize the utterance. Such feature signals may typically be derived from spectral analysis or linear prediction analysis of the utterance. Initially, the recognition system apparatus is trained through the use of input utterances of identified reference words. Each input utterance of a known, identified word is analyzed to provide a set of reference feature signals, which reference signals are stored. Subsequent to the storage of a set of reference signals for each reference word to be recognized by the system, an unknown utterance is analyzed and a set of feature signals representative of the unknown utterance is obtained. The unknown utterance feature signals are compared with the sets of stored reference feature signals to determine the correspondence or degree of dissimilarity or similarity therebetween. After the comparisons are completed, the unknown utterance is identified as the reference signal whose feature signals most closely correspond to the feature signals of the unknown utterance.

As to a signal comparison technique, dynamic programming is a technique which is known for solving various optimization problems. Dynamic programming can also be used for time warping, e.g., one signal may be non-linearly stretched or compressed in either time or space to optimally match another signal. Signal processors, which have an architecture for allowing efficient solution of such dynamic time warping problems through the use of parallel processing, are known. For example, a copending application by the instant applicants, i.e., Ser. No. 245,952 now U.S. Pat. No. 4,384,273; entitled "Time Warp Signal Recognition Processor for Matching Signal Patterns" and filed Mar. 20, 1981, discloses a signal processor which includes an orthogonal array of processor cells. Each cell is connected to its nearest neighboring cells (i.e., to its nearest upward cell and to its nearest rightward cell). Also, each cell can be structurally similar to each and every other cell. More particularly, data are synchronously extended in a left-to-right as well as in a bottom-to-top direction by means of data channels. As the data are so extended, the signal processor generates a measure of the correspondence between the input signals. In generating the correspondence measure, the processor includes an arrangement for controlling all processor cells on a predetermined diagonal of the array of cells. Thereby all cells coupled to the predetermined diagonal can operate in parallel to increase the efficiency of the signal processor. Also, not only can all cells on each diagonal operate in parallel but also one or more of the plurality of diagonals can operate as a group and in parallel for processing the same or different sets of input signals.

This combination of data and control information flow jointly with the orthogonal array of processor cells comprises a structure capable of efficiently solving a class of pattern matching problems such as may occur in a speech signal or visual signal recognition system. However, known signal processors tend to contemplate many processor cells and hence tend to be expensive.

SUMMARY OF THE INVENTION

This and other problems are solved in accord with the principles of our invention by a recirculating, reduced array signal processor, system and method for time warping and for matching signal patterns. Our improved arrangement dynamically time warps an unknown input signal with respect to a reference input signal or vice versa. By extending data and control information among a plurality of processor cells according to a predetermined sequence, a measure of the dissimilarity or similarity between the input signals is generated. In generating the measure, the instant arrangement, responsive to the sequence of control steps, permits the parallel processing of the input signals by the processor cells, the cells being individually responsive to control signals extended on a respective one or more control diagonals.

According to one aspect of our invention, as the input signals are processed through a signal processor to respective output terminals, the signals may be recirculated according to a specific method as input signals to respective ones of the cells. According to another aspect of our invention, recirculating signals through the processor according to the specific method permits a reduction in the numbers of processor cells.

BRIEF DESCRIPTION OF THE DRAWING

Our invention should become apparent when taken in conjunction with the detailed description and the accompanying drawing, in which.

DETAILED DESCRIPTION

Figure 1:
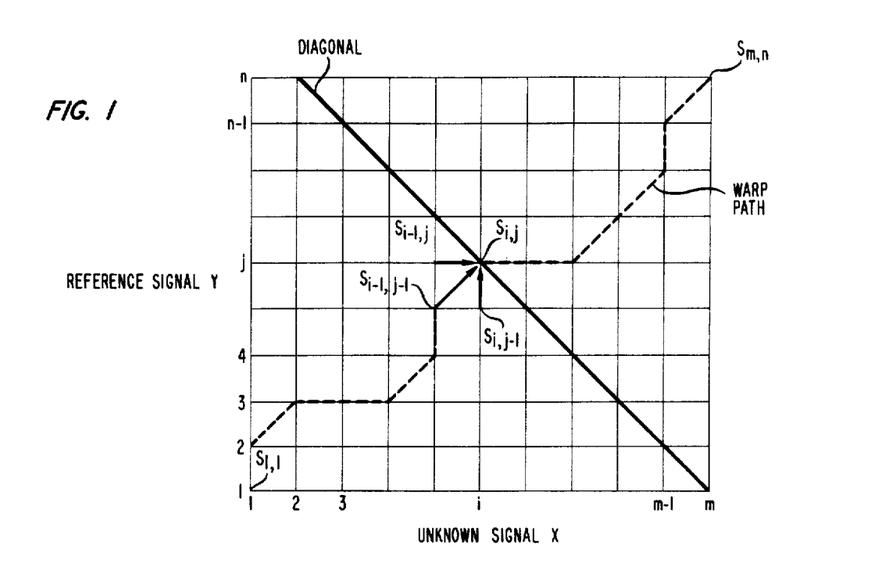
FIG. 1 illustrates an orthogonal grid which is useful in describing dynamic time warping.

FIG. 1 depicts an orthogonal grid in the form of an orthogonal array which is useful in describing our dynamic time warping arrangement. Broadly, in dynamic time warping, a first signal may be non-linearly stretched with respect to a second signal for minimizing an overall optimization measure. More particularly, FIG. 1 contemplates an unknown signal vector X and a reference signal vector Y having respectively m and n elements, the elements respectively along orthogonal i and j axes. A warp path, depicted in FIG. 1 as a dashed line, associates one or more elements of reference signal Y with each element of unknown signal X, or vice versa, thereby defining the manner in which unknown signal X may be stretched, i.e., time warped, to match reference signal Y or vice versa. Each element $x_i$ of unknown signal X may be compared with each element $y_j$ of stored reference signal Y to determine the degree of correspondence therebetween. In evaluating the correspondence, an optimization, e.g., distance, measure $D_{i,j}$ which measures the dissimilarity or similarity between an element of unknown signal X and an element of reference signal Y may be generated at each grid intersection point (i,j). The distance measures may be algebraically weighed and summed over all pairs of data elements included on the warp path to generate an overall distance measure $S_{m,n}$, which overall measure describes the total distance between the two signals. Firstly, in so doing, the optimal warp path may be defined to be that warp path which obtains the closest correspondence between unknown signal X and reference signal Y, e.g. the warp path having the smallest overall distance measure. Secondly, the optimal overall distance may be defined to be the overall distance measure which is associated with the optimal warp path. Thirdly, the unknown utterance may be identified as the reference work whose feature signals most closely correspond, e.g. whose feature signals have the smallest optimal overall distance, to the feature signals of the unknown utterance.

Although various optimization measures are possible, in the instant description of an illustrative embodiment of the principles of our invention, we assume scalar feature signals and we employ a measure of the Euclidean distance between elements of the two vectors. Therefore, along the horizontal i-axis, we contemplate an unknown signal X including m elements, each element $x_i$ characterized by its own feature signal scalar. In parallel fashion, along the vertical j-axis, we contemplate a reference signal Y including n elements, each element $y_j$ characterized by its own feature signal scalar. At each grid intersection point (i,j) in FIG. 1, there is a possible match between one element of reference signal Y and one element of unknown signal X. Thusly, for each such intersection point (i,j), distance measure $D_{i,j}$ for measuring the dissimilarity or the similarity between the two elements can be determined as a function of the two feature vectors. For example, with $x_i$ as the i-th scalar element of X and $y_j$ as the j-th element of Y, then on distance measure could be $D_{i,j} = |x_i - y_j|$, or stated in words $D_{i,j}$ equals the magnitude, or algebraic absolute value, of the difference between the $x_i$ and $y_j$ elements.

Unknown signal X may be matched to reference signal Y by finding a monotonically increasing warp path extending from grid point (1.1) to grid point (m,n) whereby an optimal warp path, such as illustrated by the dashed line in FIG. 1, is formed. The optimal overall distance may then be generated as the weighted sum of the distance measures associated with all grid points which lie on the optimal warp path. Toward that end, it is known from dynamic programming theory that, if a point (i,j) lies on an optimal path, then the subpath from (1,1) to (i,j) is locally optimal. Hence, the minimal distance from (1,1) to (m,n) may be recursively obtained by finding locally optimal paths from a first intersection point through intermediate points to a second intersection point.

Although various recursive relationships for finding the optimal warp path are possible, a general class of such relationships may be characterized by the following:

$$S_{i,j} = \min [W_{p,q} \times D_{i,j} + S_{p,q}] \qquad (1)$$

where:

$1 \leq p \leq i$
$1 \leq q \leq j$
$(p,q) \neq (i,j)$ and where $S_{i,j}$ is the partial sum of the distances on the optimal path from point (1,1) to point (i,j) and where $W_{p,q}$ is a weighting factor which may be a function of the position of point (p,q) relative to point (i,j) and which operates as a means for constraining the optimal path. Also various boundary conditions may be used to initialize recursive relationship (1). For example, partial sums $S_{0,0}$; $S_{0,j}$ where $j = 1, \ldots n$: and $S_{i,0}$ where $i = 1, \ldots m$ may be predetermined values. Thusly, stated in words, partial sum $S_{i,j}$ equals the minimum of a set of weighted sums formed by adding partial sum $S_{p,q}$ corresponding to grid point (p,q), point (p,q) being not above and being not to the right of grid point (i,j), to distance measure $D_{i,j}$ after $D_{i,j}$ is weighted through multiplication by a factor $W_{p,q}$.

In the following description we employ two alternative subsets of recursive relationship (1) for finding the optimal warp path. The first alternative subset is:

$$S_{i,j} = \min[D_{i,j} + S_{i-1,j}; 2 \times D_{i,j} + S_{i-1,j-1}; D_{i,j} + S_{i,j-1}] \qquad (2)$$

where:

$S_{0,j} = \infty$
$S_{i,0} = \infty$
$S_{0,0} = 0$
$j = 1, \ldots, n$
$i = 1, \ldots, m$ Partial sum $S_{m,n}$ is then a measure of the dissimilarity or the similarity of the two vectors over the optimal warp path according to recursive relation (2). As a result, the reference signal Y having the smallest overall distance measure $S_{m,n}$ with respect to unknown signal X can then be said to be the closest match to unknown signal X.

Figure 2:
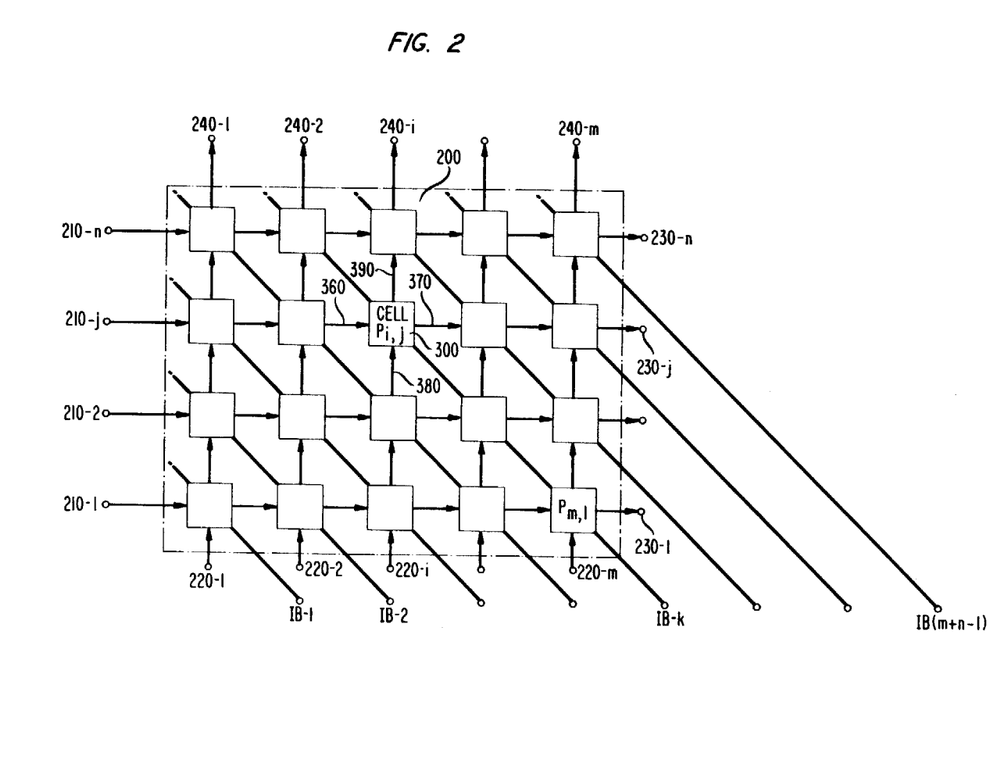
FIG. 2 illustrates a signal processor structure such as is disclosed in the aforecited copending application and is illustrative of a full size processor array useful in describing the principles of our invention.

FIG. 2 illustrates signal processor 200 for dynamically time warping and for matching signal patterns, e.g., by diagonally controlling the matching of unknown signal X and reference signal Y as disclosed in the aforecited copending application. Each of the m × n processor cells $P_{i,j}$ in FIG. 2 is adapted for operation at a respective one of grid intersection points (i,j) in FIG.

1. Also, each cell may be substantially similar to every other cell.

Firstly, for dealing with data, signal processor 200 includes a plurality of vertical data cables, such as cables 380 and 390, and a plurality of horizontal data cables, such as cables 360 and 370. The vertical data cables are for extending data from a first bottom processor cell to a second top cell, the second cell usually being immediately atop the first cell, e.g. data may be extended from processor cell $P_{i,j}$ to cell $P_{i,j+1}$ by way of cable 390. The horizontal data cables are for extending data from a first left processor cell to a second right cell, the second cell usually being immediately to the right of the first cell, e.g., data may be extended from processor cell $P_{i,j}$ to cell $P_{i+1,j}$ by way of cable 370. It may be noted from recursive relations (1) and (2) that partial sum $S_{i,j}$ is a function of distance measure $D_{i,j}$ as well as a function of partial sums below and to the left of processor cell $P_{i,j}$. Distance measure $D_{i,j}$ is in turn a function of input signal elements $x_i$ and $y_j$. Thusly, element $x_i$ of unknown signal X may be extended from input terminal 220-i to cell $P_{i,1}$, while element $y_j$ of reference signal Y may be extended from input terminal 210-j to cell $P_{1,j}$. Thereafter, element $x_i$ of unknown signal X is extended from bottom-to-top over the appropriate vertical data cables (e.g., from processor $P_{i,j}$ upward either to processor $P_{i,j+1}$ or to output terminal 240-i) while element $y_j$ of reference signal Y is extended from left-to-right over the appropriate horizontal data cables (e.g., from processor $P_{i,j}$ rightward either to processor $P_{i+1,j}$ or to output terminal 230-j). Data such as partial sum $S_{i,j}$ may be extended from processor cell $P_{i,j}$ to all processors above and to the right via these same vertical and horizontal data cables, e.g., processor cell 300 may extend its partial sum along with any partial sum received from a processor cell below or to the left of cell 300 to all processor cells above and to the right of cell 300 via cables 390 and 370. It is thus clear that this arrangement of vertical and horizontal data cables may be used to transmit signal element data and partial sum data from any processor cell $P_{p,q}$ to processor cell $P_{i,j}$ where $p \leq i$ and $q \leq j$ thereby satisfying the path constraint data requirements dictated by either relation (1) or relation (2).

Secondly, for dealing with control information, processor 200 includes a plurality of diagonal control arrangements, e.g., instruction buses IB-k, which are shown as approximately of negative unit slope with respect to the horizontal i-axis. That is, diagonal processors $P_{i,j}$ and $P_{i+1,j-1}$ are on the same predetermined control instruction bus. As a result, each processor, which is coupled to the predetermined diagonal, can concurrently have available the same control information. It may be noted from recursive relations (1) and (2) that partial sum $S_{i,j}$ is a function of partial sums generated below and to the left of processor cell $P_{i,j}$ but is independent of partial sums generated above and to the right of cell $P_{i,j}$. As a result, processor cell $P_{i,j}$ would not usually generate a partial sum $S_{i,j}$ until all processors below and to the left of cell $P_{i,j}$ had generated their respective partial sums. More particularly, processor cell $P_{i,j}$ when connected to control instruction bus IB-k would not usually generate its partial sum $S_{i,j}$ until all processor cells on instruction bus IB-(k−1) had generated their respective partial sums.

Control information may be extended along control instruction bus IB-k, responsive to which each processing cell $P_{i,j}$ connected to bus IB-k would generate its respective partial sum $S_{i,j}$ based on input signal data and partial sum data, which data had priorly been generated by cells below and to the left of processing cell $P_{i,j}$ and which data may be extended to cell $P_{i,j}$ via cells such as cells $P_{i-1,j}$ and $P_{i,j-1}$ connected to control instruction bus IB-(k−1). Thereafter, responsive to control information extended along control instruction bus IB-(k+1) and responsive to data transmitted from cells below and to the left, processing cells connected to bus IB-(k+1) generate their respective partial sums. Thereby, all processors on the diagonal can operate in parallel for generating their respective partial sums.

Thirdly, it should be clear that, when a processing step of a cell on diagonal IB-k is complete, the input signal data and the partial sum data used and/or generated during the processing step may be transmitted to the cells on diagonal IB-(k+1) for processing thereby. As a result, processor cells on adjacent diagonals may concurrently perform different steps of the processing, e.g., cells on diagonal IB-(k+1) may generate a distance measure while cells on diagonal IB-k, having previously generated their respective distance measures, may generate partial sums. Furthermore, when all processing steps on diagonal IB-k are complete and all data used and/or generated during those processing steps has been transmitted to diagonal IB-(k+1), the processing cells on diagonal IB-k would be immediately available for processing still other data. Thus adjacent diagonals may also concurrently process different unknown signals and different reference signals. Hence not only does processor 200 give advantages as to the parallel processing of all cells on a specific diagonal but processor 200 also gives advantages as to the parallel processing of different sets of input signals on different diagonals. As a result, up to $(m+n-1)/2$ pairs of input signals may be processed in parallel by signal processor 200. Further, generation of the overall distance measure for one reference signal Y and one unknown signal X is complete when all $(m+n-1)$ diagonals, beginning with diagonal IB-1 and ending with diagonal IB-(m+n−1), have performed their respective processing. Thus, the diagonal parallel processing may proceed in a wave-like manner across the $(m+n-1)$ diagonals in such a way that all processor cells in signal processor 200 may operate in parallel.

Fourthly, for explaining the operation of illustrative signal processor 200, we use a specific four processor step example. From the example, the manner in which the input signals are skewed in time for synchronizing the processing should become clear.

During a first processor step, assume processor cell $P_{1,1}$ has extended thereto unknown element $x_1$ from input terminal 200-1 and reference element $y_1$ from input terminal 210-1. Responsive to a first "execute" instruction extended from terminal IB-1 over diagonal instruction bus IB-1, processor cell $P_{1,1}$ generates or computes Euclidean distance $D_{1,1}$.

During a second processor step, unknown element $x_1$ may be extended upward from processor cell $P_{1,1}$ to processor cell $P_{1,2}$ while reference element $y_1$ may be extended rightward from processor cell $P_{1,1}$ to processor cell $P_{2,1}$. Concurrently, unknown element $x_2$ may be extended from input terminal 220-2 to processor cell $P_{2,1}$ while reference element $y_2$ may be extended from input terminal 210-2 to processor cell $P_{1,2}$. Responsive to a second execute instruction extended from terminal IB-2 over diagonal instruction bus IB-2, diagonal processor cells $P_{1,2}$ and $P_{2,1}$ generate in parallel their respective Euclidean distance measures $D_{1,2}$ and $D_{2,1}$.

During a third processor step, unknown elements $x_1$ and $x_2$ may be extended upward and in parallel from respective processor cells $P_{1,2}$ and $P_{2,1}$ to respective processor cells $P_{1,3}$ and $P_{2,2}$ on diagonal bus IB-3. Concurrently, reference elements $y_1$ and $y_2$ may be extended rightward and in parallel from processor cells $P_{2,1}$ and $P_{1,2}$ to respective processor cells $P_{3,1}$ and $P_{2,2}$ on diagonal bus IB-3. Also concurrently, unknown element $x_3$ may be extended from input terminal 220-3 to processor cell $P_{3,1}$ while reference element $y_3$ may be extended from input terminal 210-3 to processor cell $P_{1,3}$. Responsive to a third execute instruction extended from terminal IB-3 over diagonal instruction bus IB-3, diagonal processor cells $P_{1,3}$; $P_{2,2}$ and $P_{3,1}$ generate in parallel their respective Euclidean distance measures $D_{1,3}$; $D_{2,2}$ and $D_{3,1}$.

During a fourth processor step, unknown elements $x_1$, $x_2$ and $x_3$ may be extended upward and in parallel from respective processor cells $P_{1,3}$; $P_{2,2}$ and $P_{3,1}$ to respective processor cells $P_{1,4}$; $P_{2,3}$ and $P_{3,2}$ on diagonal IB-4. Concurrently, reference elements $y_1$, $y_2$ and $y_3$ may be extended rightward and in parallel from respective processor cells $P_{3,1}$; $P_{2,2}$ and $P_{1,3}$ to respective processor cells $P_{4,1}$; $P_{3,2}$ and $P_{2,3}$ on diagonal bus IB-4. Also concurrently, unknown element $x_4$ may be extended from input terminal 220-4 to processor cell $P_{4,1}$ while reference element $y_4$ may be extended from input terminal 210-4 to processor cell $P_{1,4}$. Responsive to a fourth execute instruction extended from terminal IB-4 over diagonal instruction bus IB-4, processor cells $P_{1,4}$; $P_{2,3}$; $P_{3,2}$ and $P_{4,1}$ generate in parallel their respective Euclidean distance measures $D_{1,4}$; $D_{2,3}$; $D_{3,2}$ and $D_{4,1}$.

Although the description of the four processor step example emphasized the flow and skewness of input signal data, i.e., of $x_i$ and $y_j$, as well as the flow of control information, it should be clear from recursive relations (1) and (2) that partial sum data also flows through processor 200. In the interest of brevity, we save a description of the flow of partial sum data until later. Whenever described, it should be clear that, when the processing on diagonal IB-k is complete, input signal data and partial sum data used and/or generated during the processing on diagonal IB-k may be transmitted to the cells on diagonal IB-(k+1) for processing thereby. When the data are so transmitted, the cells on diagonal IB-k are immediately free for processing another set of input signals.

Turning now to the individual processor cells, each processor cell $P_{i,j}$ such as cell 300 may be a general purpose processor, for example, a microprocessor with associated read only memory for storing instructions, or a special purpose processor, for example, a specifically designed processor for providing the relatively simple computations suggested by recursive relations (1) or (2). An added advantage of a special purpose processor cell obtains from the usually fewer number of components and hence, the usually smaller and less costly apparatus and hence, the possibility for integrating several such cells on a single chip using very large scale integration (VLSI) techniques. Still another advantage of a special purpose processor is that its architecture can be specially designed to solve a class of problems more efficiently. Whichever cell design is used, the following description is intended to exemplify the internal operation of a typical cell.

Figure 3:
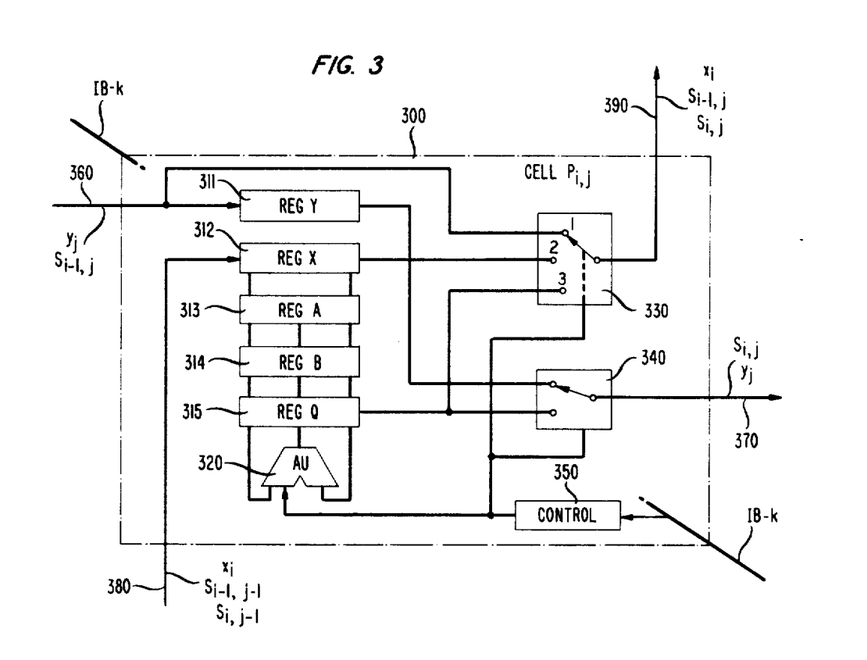
FIG. 3 illustrates a processor cell such as is disclosed in the aforecited copending application and is useful in describing the illustrative embodiment of FIG. 2.

Refer now to FIG. 3, which schematically illustrates a functional processor cell $P_{i,j}$. Also, in the following description we assume a path constraint formed by recursive relation (2).

During a first stage of processor $P_{i,j}$'s operation, a reference signal element $y_j$ is extended either from input terminal 210-j or from processor cell $P_{i-1,j}$ over cable 360 to Y register 311 while a corresponding unknown signal element $x_i$ is extended either from input terminal 220-i or from processor $P_{i,j-1}$ over cable 380 to an input of X register 312. As will shortly be made clear, while Y register 311 is receiving $y_j$, Q register 315 is transmitting a priorly generated partial sum $S_{i,j}$. Continuing, under control of control unit 350, which also controls switches 330 and 340 as well as arithmetic unit 320, and responsive to an execute instruction detected on instruction bus IB-k, the two elements are subtracted from each other during this first stage of processor $P_{i,j}$'s operation and the magnitude of the difference is then stored in Q register 315 for generating the Euclidean distance $D_{i,j}$. It was this first stage which was emphasized in our earlier description of the specific four processor step example. The following emphasizes still other stages.

During a second stage of processor $P_{i,j}$'s operation, partial sum $S_{i-1,j-1}$ from the cell below and to the left, i.e., from cell $P_{i-1,j-1}$, is extended via processor $P_{i,j-1}$ over cable 380 to X register 312. Concurrently, reference signal element $y_j$ previously stored in Y register 311 is extended through position 1 of switch 340 thence over cable 370 to rightward cell $P_{i+1,j}$. Also concurrently, unknown signal element $x_i$ previously stored in X register 312 is extended through position 2 of switch 330 over cable 390 to upward cell $P_{i,j+1}$. Still concurrently, distance measure $D_{i,j}$ which was stored in Q register 315 during the first stage, is algebraically added to itself thereby forming $2 \times D_{i,j}$, this $2 \times D_{i,j}$ datum being stored in A register 313. The datum stored in A register 313 is thereafter algebraically added to partial sum $S_{i-1,j-1}$, which had been stored in X register 312, thereby generating $(2 \times D_{i,j}) + S_{i-1,j-1}$, this datum being stored in A register 313.

Nextly, during a third stage of processor $P_{i,j}$'s operation, partial sum $S_{i-1,j}$ from leftward cell $P_{i-1,j}$ is extended over cable 360 to Y register 311 and also through position 1 of switch 330 over cable 390 to upward processor $P_{i,j+1}$. Concurrently, partial sum $S_{i,j-1}$ from bottom cell $P_{i,j-1}$ is extended over cable 380 to X register 312. Nextly, under control of control unit 350 and arithmetic unit 320, the minimum of $S_{i-1,j}$ previously stored in Y register 311 and $S_{i,j-1}$ previously stored in X register 312 is formed, this result being stored in B register 314. The minimum stored in B register 314 is subsequently algebraically added to $D_{i,j}$ previously stored in Q register 315 thereby generating $D_{i,j}$ plus the minimum as between $S_{i-1,j}$ and $S_{i,j-1}$, this result being stored in B register 314. Thereafter, under control of control unit 350 and arithmetic unit 320, the minimum of the intermediate results previously stored in A register 313 and B register 314 is generated, the generated minimum being stored in Q register 315 as partial sum $S_{i,j}$ according to recursive relation (2).

Finally, during a fourth stage of processor $P_{i,j}$'s operation, the partial sum $S_{i,j}$ is extended from Q register 315 through position 2 of switch 340 over cable 370 to processor cell $P_{i+1,j}$. Concurrently partial sum $S_{i,j}$ is extended from Q register 315 through position 3 of switch 330 over cable 390 upward to processor cell $P_{i,j+1}$.

As priorly mentioned, it should be clear that certain of the four described stages can occur concurrently. For example, as input signal elements $x_i$ and $y_j$ of one unknown-reference signal pair are being received by processor $P_{i,j}$, the contents of Q register 315 may be transmitted over cable 370 to the right, i.e., transmitted either to processor $P_{i+1,j}$ or to output terminal 230-j as partial sum $S_{i,j}$ of a previous unknown-reference signal pair. Concurrently, partial sum $S_{i,j}$ may be transmitted over cable 390 upward, i.e., transmitted either to processor $P_{i,j+1}$ or to output terminal 240-i. By so overlapping functions of a processor $P_{i,j}$ still further efficiencies are obtained from signal processor 200.

In accord with the principles of our invention, a recirculating signal processor is possible. By a specific method for appropriately re-directing output signals from cells near a first, e.g., the right, output periphery of the processor back to cells near a second, e.g., the left, input periphery, input signal elements $x_i$ and/or $y_j$ as well as partial computation results can be recirculated, saved and employed in further processing. That is, by re-directing the output signals, information can be recirculated through the array in accord with one aspect of the principles of the instant invention.

Thus far the description has illustrated a signal processor array for processing an array of m × n input signal elements and has suggested that the processor requires m × n processor cells. Hereinafter such a signal processor is called a full size array processor. Unfortunately, a full size array signal processor could employ hundreds or even thousands of processor cells. In accord with the principles of our invention, a signal processor for processing m × n input signal elements but having less than m × n cells is possible, i.e., a reduced sized array signal processor is possible.

Figure 6:
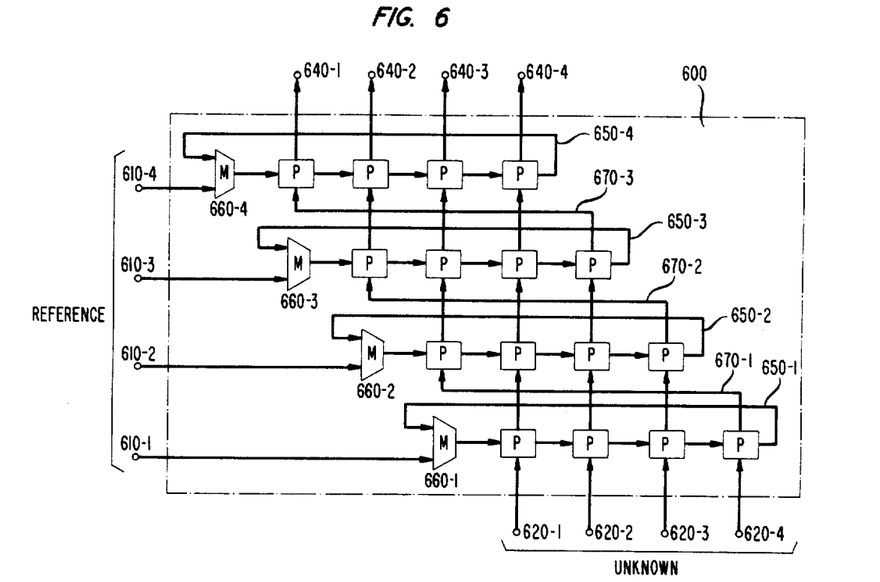
FIG. 6 illustrates an array processor structure for describing a recirculating aspect of the principles of our invention.
Figure 8:
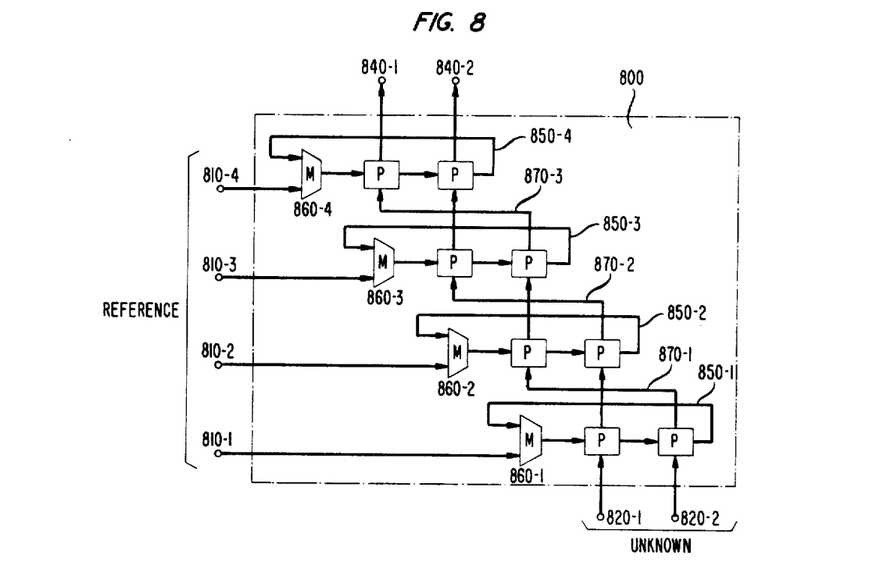
FIG. 8 illustrates an array processor structure for describing a reduced array aspect of the principles of our invention.

Illustrative embodiments of the principles of the instant invention are shown in FIGS. 6 and 8 which also illustrate respectively the aforementioned recirculating and reduced array aspects thereof. Each illustrative structure has several characteristics including:

(1) Some connections evident in the FIG. 2 full size array structure can be retained in the recirculating and reduced array embodiments, and (2) An output signal from cells near a first, e.g., right, periphery can be redirected or fed back or recirculated according to a specific method or strategy to cells near a second, e.g., left, periphery as an input signal and there can be multiplexed with other input signal elements.

Alternative embodiments of the principles of our invention are possible as will soon be clear. For example, a first alternative structure could be wired for skewed virtual signal propagation up a predetermined array diagonal. Such a first structure could be useful for speech recognition where the unknown speech pattern may be relatively short (e.g., corresponding to an isolated word). A second alternative structure could be wired for virtual signal propagation from the left periphery of the array to its right periphery. Such a second structure could be useful for speech recognition where the unknown speech pattern may be relatively long (e.g., corresponding to an entire sentence). Accordingly, a specific embodiment of recirculation paths, when considered in conjunction with input feature signal elements, will usually result in a specific movement of signals through the processor.

As in FIGS. 6 and 8, input reference signals from terminals 610-j and 810-j can be multiplexed through respective multiplexers 660-j and 860-j with recirculation line signals from respective first recirculation paths 650-j and 850-j so that reference signals can be entered and reentered in the processor. After the propagation of one reference signal through the processor, a next reference signal(s) can be input to the processor. Of course it should be clear that not only can reference signals be recirculated but also specific connections can be made in alternative embodiments to recirculate unknown signal elements and thus avoid having to duplicate the unknown signal at terminals 620-i and 820-i. Thus the principles of our invention as applied to recirculating processors and/or reduced array processors are not limited to the disclosed illustrative embodiments but extend broadly to other embodiments as should be clear to the skilled artworker after understanding those principles.

We now turn to specific examples for more particularly illustrating differences between a full sized array signal processor and a recirculating and/or reduced array signal processor consistent with the principles of the instant invention. The examples will be based on substantially the same time warp problem so that comparisons may be made between the respective signal propagation patterns. To facilitate the comparisons, the illustrative examples are organized and described in terms of a plurality of time snapshots, each snapshot for showing the state of the cells in a processor at a specific instant in time.

So much for a brief introduction. Now consider two reference signal patterns, $A = \{a_1, a_2, a_3, a_4\}$ and $B = \{b_1, b_2, b_3, b_4\}$ and a single unknown signal pattern $C = \{c_1, c_2, c_3, c_4\}$ where each of the patterns includes four feature signal elements. A distance measure $D_{i,j}$ between a reference signal and an unknown signal can be defined as the absolute scalar difference; for example:

$$D_{i,j} = |c_i - a_j| \tag{3}$$

As priorly mentioned in this description we employ two alternative subsets of recursive relationship (1) for finding the optimal warp path. The first alternative is equation (2). The following second alternative subset of recursive relationship (1) will allow the warp path to take only vertical or horizontal steps:

$$S_{i,j} = D_{i,j} + \min(S_{i-1,j}, S_{i,j-1}) \tag{4}$$

The path constraint problem defined by equation (4) can be solved using an array processor including processor cells which have two stages of operation. In the first stage, (a) scalar feature signals are read; (b) $D_{i,j}$ is computed in accord with equation (3); (c) $D_{i,j}$ is stored; and (d) the feature signals are respectively extended to processor cells to the top and to the right of the instant cell. In the second stage, (a) partial sums are read from cells to the left and below the instant cell; (b) the minimization of equation (4) is performed; (c) the minimum partial sum is added to the stored value of $D_{i,j}$, the later being provided by the first stage; (d) then the new partial sum $S_{i,j}$ is extended to processor cells to the top and to the right of the instant cell.

In order to illustrate the movement or propagation of signals through the processor, we now define and use certain mathematical symbols to indicate the specific computation being performed in the respective processor cells at a particular instant in time. For example, relating to the above described first stage, the symbol pairs $a_jc_i$ and $b_jc_i$ are used to identify the distance computation of equation (3) in which the respective j-th feature of reference signals A or B is compared with the i-th feature of unknown signal C. Also, relating to the above described second stage, the respective symbols $A_{ij}$ and $B_{ij}$ are used to identify the partial sum $S_{i,j}$ computation of equation (4) for respective reference signals A or B. Accordingly, in the following description as applied to FIGS. 4 and 5; to FIGS. 6 and 7 as well as to FIGS. 8 and 9, the presence of a respective one of the symbols $a_jc_i$, $b_jc_i$, $A_{ij}$, or $B_{ij}$ in a processor cell will indicate that that processor cell is currently executing that particular first or second stage computation.

FULL SIZE ARRAY PROCESSOR EXAMPLE

Figure 4:
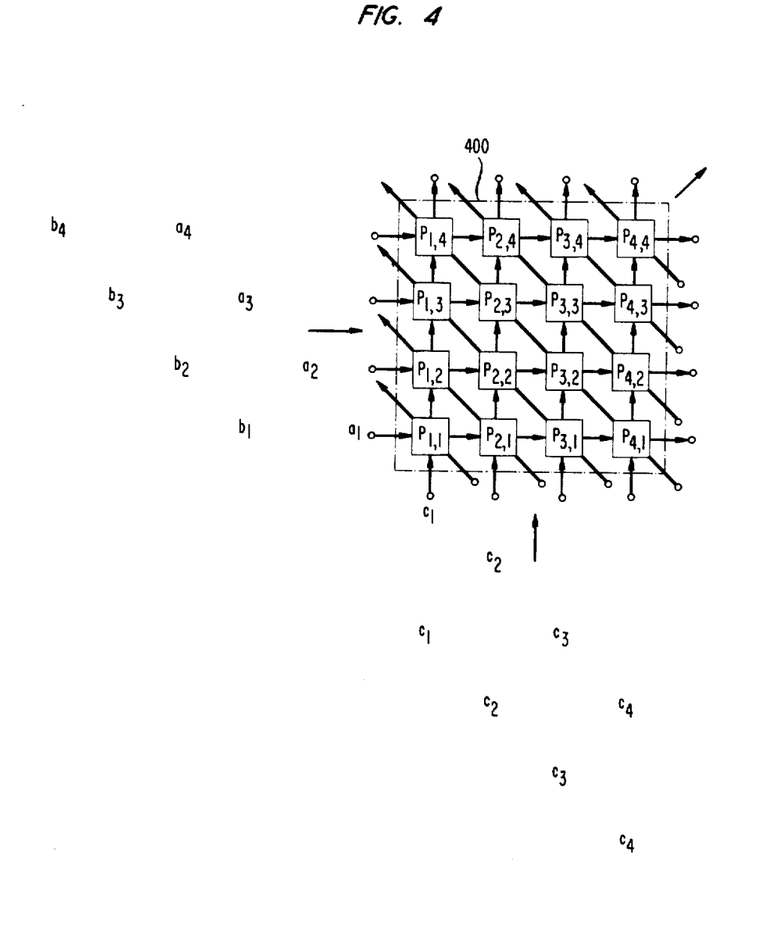
FIG. 4 illustrates the structure of FIG. 2 for a specific four-by-four full size array signal processor.

For our first example, refer to the structure shown in FIG. 4, which illustrates a full size array signal processor of a type disclosed in the aforecited copending application and similar to that illustrated in FIG. 2. In particular, FIG. 4 depicts an illustrative 4×4 signal processor 400 with unknown signal C and reference signals A and B, each signal shown as a skewed vector to illustrate the timing aspect priorly described. Now with the aid of FIG. 5 we describe the signal propagation while processor 400 is executing. In particular, since both the reference signal and the unknown signal are each assumed to be four scalar elements in length, the full array processor 400 contains 4×4 (=16) processor cells.

Figure 5:
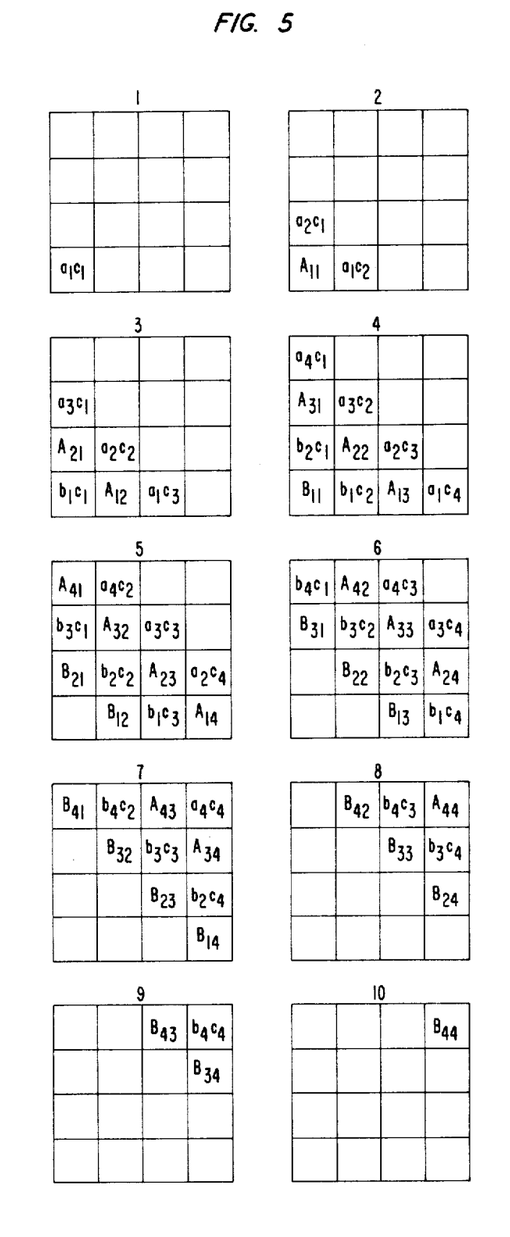
FIG. 5 illustrates a plurality of snapshots, each snapshot taken at a specific instant in time and each snapshot identifying illustrative contents of the respective cells in the structure shown in FIG. 4.

The first snapshot in FIG. 5 shows a reference feature input $a_1$ from the left and an unknown input $c_1$ from below, both inputs to processor cell $P_{1,1}$ which cell computes, in the first stage, the distance measure $D_{1,1}(=|c_1-a_1|)$, which measure is illustrated in FIG. 5 by the symbol $a_1c_1$. Thereafter reference element $a_1$ is extended to the right, i.e. to cell $P_{2,1}$, and unknown element $c_1$ is extended to the top, i.e. to cell $P_{1,2}$. The second snapshot in FIG. 5 shows processor cell $P_{1,1}$ performing the second stage partial sum computation. Partial sum $A_{11}$ is then extended to processor cells $P_{1,2}$ and $P_{2,1}$, respectively above and to the right of the instant cell. While this second stage computation is happening, the two processor cells, i.e., cells $P_{1,2}$ and $P_{2,1}$, on the diagonal immediately to the right are performing their respective first stage distance computations on feature data extended thereto either from another input terminal or from another processor cell. The third snapshot shows the beginning of a pattern comparison between a second reference signal, i.e., signal B, and unknown signal C, i.e., the computation of distance measure $D_{1,1}(=|c_1-b_1|)$, which measure is illustrated in FIG. 5 by the symbol $b_1c_1$. The remainder of the computations and signal propagation may now be apparent. It produces a movement of signals as a virtual group of four adjacent computational waves which alternate between first stage distance and second stage partial sum computations for reference patterns A or B versus unknown pattern C. The processor cells on one diagonal are all executing the same stage, i.e., either distance or partial sum computations. Also, the entire group advances one diagonal to the right for each computation stage. Hence, relative to a single diagonal, program stages alternate between distance (stage 1) and partial sum (stage 2) computations. Partial sum data is being produced at an output of upper right processor cell $P_{4,4}$ but it is only meaningful or valid at certain instants in time. For example, during the eighth snapshot, processor cell $P_{4,4}$ is outputting $A_{44}$ which is the global time warp optimized distance measure between reference pattern A and unknown pattern C while, during the tenth snapshot, processor cell $P_{4,4}$ is outputting $B_{44}$ which is the global time warp optimized distance measure between reference pattern B and unknown pattern C. Hence, the entire process is seen to take ten subprogram (or snapshot) steps from start to finish, with a new global pattern distance measure being produceable every two subprogram steps.

RECIRCULATING ARRAY PROCESSOR EXAMPLE

Figure 7:
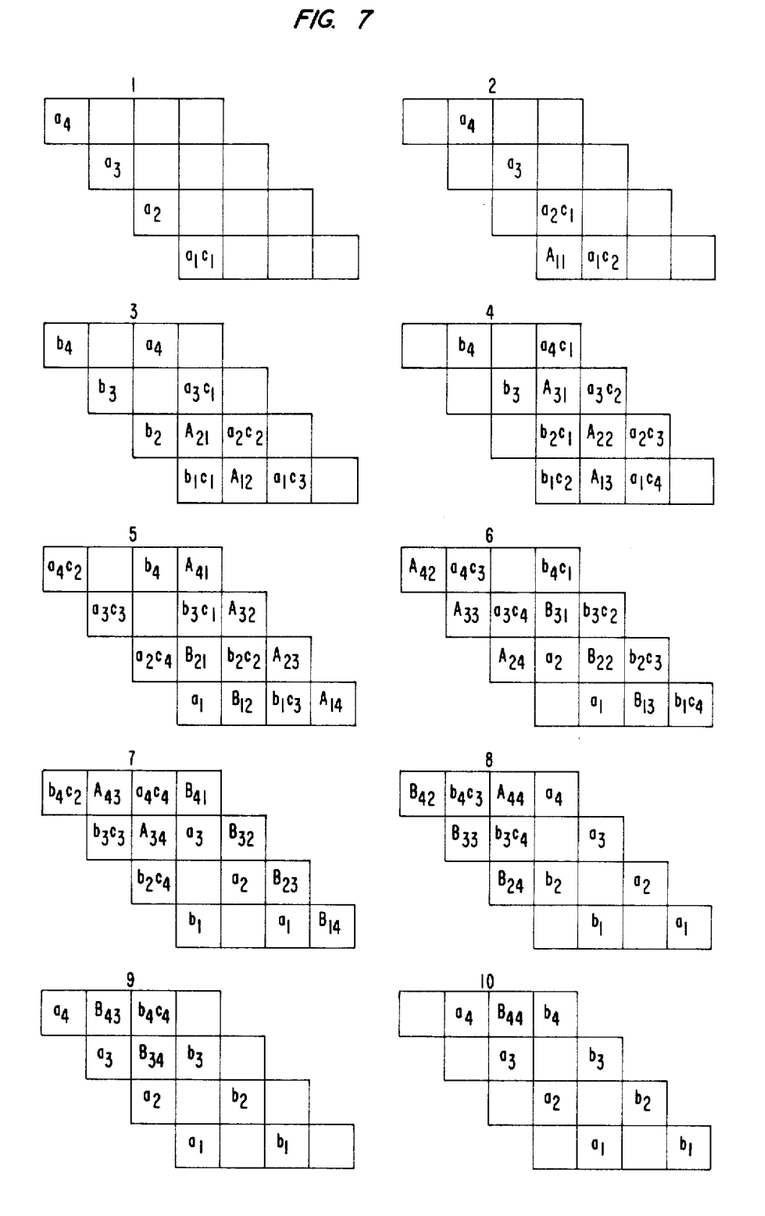
FIG. 7 illustrates a plurality of snapshots, each snapshot taken at a specific instant in time and each snapshot identifying illustrative contents of the respective cells in the structure shown in FIG. 6.

FIG. 6 depicts an illustrative recirculating array processor in accord with one aspect of our invention while FIG. 7 shows the computational flow of signals propagated through the structure of FIG. 6. In order to illustrate a recirculation aspect of the present invention, for this example, the array contains the same number of processors as the 4×4 full size array processor of FIG. 4. Therefore no reduction in number of cells is obtained. Notwithstanding, FIGS. 6 and 7 serve to illustrate the recirculating aspect.

As with full size processor 400, execution with recirculating processor 600 begins in the left bottom row processor cell, where the distance measure for the first element of reference pattern A and later reference pattern B with respect to unknown pattern C are computed. Notice that, unlike the full size array processor, the entire A pattern is concurrently input to recirculating processor 600 in order to satisfy the aforementioned timing and data skewing requirements.

Comparing FIGS. 5 and 7 it may be noted that the first four snapshots using recirculating processor 600 appear substantially identical to the first four snapshots using full array processor 400, with the six upper left processor cells serving merely to skew incoming data. Now, at the fifth snapshot, some fortuitous results occur in accord with the principles of the instant invention. At this fifth snapshot, input from the left, i.e., from terminals 610-j, may be terminated, e.g., switched off, while recirculation paths 650-j from the right periphery may be enabled, e.g., may be switched on through multiplexer 660-j. Responsive thereto, elements of reference signal A are extended from an output of a cell near the right periphery over a respective first recirculation path 650-j to an input of a cell near the left periphery through a respective multiplexer 660-j. In addition, elements of unknown signal C are extended over a respective second recirculating path 670-j from the right periphery cells on a first horizontal level to the left periphery cells on a second next higher horizontal level. As a result, input feature signals are, fortuitously, extended to the correct cells for computing the first stage distance measure or the second stage partial sum in the respective processor cells which cells had already completed a prior processing task, such as that aforedescribed. Here note that the left diagonal in the fifth snapshot in FIG. 7 is equivalent to the fifth diagonal in the fifth snapshot in FIG. 5. Thereafter, the right half of recirculating array processor 600 remains substantially equivalent to the lower left of full array processor 400, while the leftmost six cells of recirculating array processor 600 remain substantially equivalent to the upper right cells of full array processor 400. Global pattern match outputs are again produced in the eighth and tenth snapshots of FIG. 7 albeit from a different cell, i.e., here from the third cell in the top horizontal level of processors, are extended therefrom to output terminal 640-3.

REDUCED ARRAY PROCESSOR EXAMPLE

Figure 9:
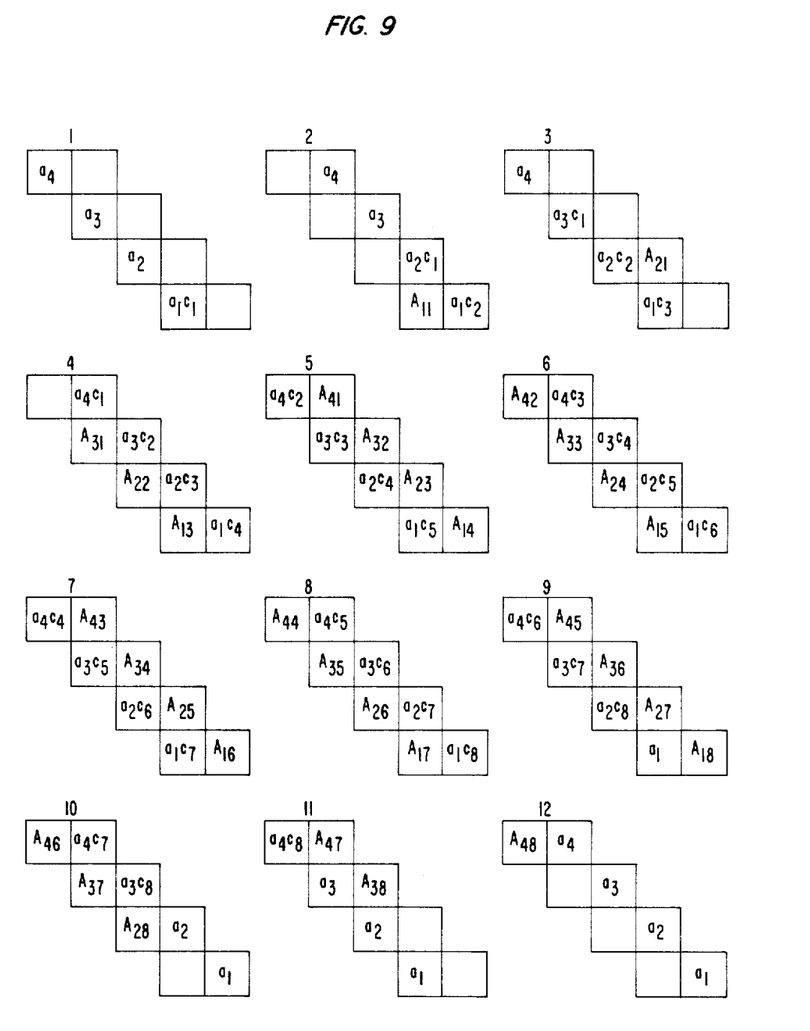
FIG. 9 illustrates a plurality of snapshots, each snapshot taken at a specific instant in time and each snapshot identifying illustrative contents of the respective cells in the structure shown in FIG. 8.

Based on the recirculation paths of FIG. 6, FIG. 8 depicts an illustrative reduced array processor in accord with another aspect of our invention while FIG. 9 shows the computational flow of signals propagated through the structure of FIG. 8. To avoid confusion and to avoid cluttering the figure and not by way of limitation, the example is based on comparing a single reference signal A and a single unknown signal C. Further, we assume that reference signal $A = \{a_1, a_2, a_3, a_4\}$ has four scalar feature signal elements while unknown signal $C = \{c_1, c_2, \ldots, c_7, c_8\}$ has eight scalar feature signal elements. With a full size array processor $4 \times 8$ ($=32$) processor cells would be used. However, as is evident from FIGS. 8 and 9, according to this second aspect, a reduced array processor of only eight (versus 32) processor cells is used. This example therefore illustrates yet another advantage of a reduced array processor in accord with the principles of the instant invention, to wit: our reduced array processor permits the design of fixed-sized processors for solving pattern matching problems which may include signal vectors which have a dimension (e.g., numbers of signal elements) larger than the processor array dimension or which may even include signal vectors which are unbounded in size. As shown in FIG. 8, reference signal A pattern elements are extended from input terminals 810-j on the left through multiplexers 860-j to the upper left four processor cells, while unknown signal C pattern elements are extended from input terminals 820-1 and 820-2, which terminals are shown below the lowest horizontal level processor cells.

It may be noted that the first and second snapshots in FIG. 9 are similar to the first and second snapshots in FIG. 7. However, at the third snapshot in FIG. 9, first recirculating paths 850-j are switched on and data recirculates back from a first output of right periphery cells through multiplexers 860-j to a first input of first left periphery cells as well as from a second output of the right cells over second recirculating paths 870-j to a second input of second left periphery cells. The net result of the recirculation is that elements of reference signal A moves horizontally from cell to cell across the array, while elements of unknown signal C move vertically from cell to cell up the array. At a cell where the A and C scalar elements intersect, a distance measure is computed, i.e., the first stage computation, while, after the distance measure computation, a partial sum is computed, i.e., the second stage computation. After twelve steps (i.e., at the eighth snapshot in FIG. 9) the partial sum result $A_{48}$ is produced in the top left cell for extension to output terminal 840-1. The remainder of the computations and signal propagation may now be apparent.

Although our invention has been described and illustrated in detail with respect to an illustrative recirculating and/or reduced array signal processor, it is to be understood that same is by way of example and is not by way of limitation. For example, as priorly mentioned, path constraints other than those set forth in recursive relations (1), (2) or (4) could work equally well in the practice of the principles of our invention. Further, although disclosed relative to a processor for solving problems in the time domain, the principles of our invention apply equally to a processor for solving problems in the space domain. Still further, although we described a sequential extension (or execution) of execute instructions to a plurality of diagonal buses, the principles of our invention apply equally to a processor including concurrent extension (or execution) of some or all execute instructions to predetermined ones of the plurality of diagonal buses. Indeed, the principles of our invention apply equally to a processor having a single bus as well as to a processor having a plurality of diagonal buses. Still even further, alternative embodiments could include one or more delay elements in the recirculating path(s). Accordingly, the scope and spirit of our invention is limited only by the terms of the appended claims.

What is claimed is:

1. A signal processor including an array of processor cells, pattern matching means for extending an input signal through said cells to an output terminal, said pattern matching means including:

first means for comparing a first unknown input signal having m elements and a first reference input signal having n elements, first means for time warping either of said first input signals with respect to the other of said first input signals, and diagonal control means coupled to said first comparing means for controlling cells on a first predetermined diagonal of said array of cells characterized in that said processor further comprises means for recirculating either of said input signals through said cells according to a predetermined methodology, said recirculating means including means for extending signals from an output of first periphery predetermined ones of said cells to an input of second periphery predetermined ones of said cells, said recirculated signals being extended for processing by said second cells.

2. The signal processor defined in claim 1 further including means for providing an optimal time warp path through said array of processor cells.

3. The signal processor defined in claim 1 further including means responsive to said diagonal control means for measuring a correspondence between said input signals and means for extending said correspondence measure to an output terminal.

4. The signal processor defined in claim 2 further including means responsive to said diagonal control means for measuring a correspondence between said input signals and means for extending said correspondence measure to an output terminal.

5. The signal processor defined in claim 1 further including second means for comparing said unknown input signal and a second reference input signal, and said diagonal control means coupled to said second comparing means for controlling cells on a second predetermined diagonal of said array of cells.

6. The signal processor defined in claim 5 further including means for parallel processing said input signal such that not only do all cells on said first diagonal parallel process said first input signals to be compared and all cells on said second diagonal parallel process said second input signals to be compared but also said first diagonal processing occurs substantially concurrent and in parallel with said second diagonal processing.

7. In a signal recognition system, a signal processor including an array of cells, said cells adapted for processing an input signal according to a predetermined criteria, and further including
    means for time warping an unknown input signal and a reference input signal,
    means responsive to said warped signals for generating a measure of the correspondence between said input signals, said generating means including means for controlling the parallel processing of a plurality cells, said plurality of cells being coupled to a predetermined diagonal of said array of cells, and
    means for extending said correspondence measure to an output terminal characterized in that
    means for recirculating either of said input signals through said cells in a predetermined sequence, said recirculating means including means for extending signals from an output of predetermined ones of said cells to an input of second predetermined ones of said cells, said recirculated signals being extended for processing by said second cells.

8. The signal recognition system defined in claim 7 wherein said signal processor further includes
    means for controlling the parallel processing of cells on a plurality of respective predetermined diagonals of said array of cells.

9. A method for matching signals, said method including the steps of
    extending an unknown input signal and a reference input signal through an array of processor cells,
    time warping one input signal with respect to the other input signal;
    processing said warped input signals in processor cells, said cells being coupled to a predetermined diagonal of said array;
    controlling said processing by having all cells coupled to said diagonal of said array concurrently processing said input signals; and
    generating during said processing a measure of the correspondence between said input signals and characterized in that said method further comprises the step of:
    recirculating either of said input signals through said cells according to a predetermined strategy.

10. The method for matching signals defined in claim 9 further comprises the step of:
    controlling the parallel processing of each of a plurality of respective diagonals of said array whereby said respective diagonals concurrently process respective input signals.

* * * * *

UNITED STATES PATENT AND TRADEMARK OFFICE
CERTIFICATE OF CORRECTION

PATENT NO. : 4,509,187

DATED : April 2, 1985

INVENTOR(S) : Bryan D. Ackland, David J. Burr and Neil H. E. Weste

It is certified that error appears in the above-identified patent and that said Letters Patent is hereby corrected as shown below:

Column 3, line 43, "work" should read --word--; line 66, "on" should read --one--. Column 4, line 34, ":" should read --;--.

Signed and Sealed this

Thirty-first Day of December 1985

[SEAL]

Attest:

*Attesting Officer*

DONALD J. QUIGG

*Commissioner of Patents and Trademarks*